(12) United States Patent
Harpster et al.

(10) Patent No.: US 11,820,197 B2
(45) Date of Patent: Nov. 21, 2023

(54) VEHICLE CONTROL ARM ASSEMBLY

(71) Applicant: Honda Motor Co., Ltd., Tokyo (JP)

(72) Inventors: Steven Matthew Harpster, Dublin, OH (US); Rajendra L. Kakarla, Plain City, OH (US); Bradley W. Klein, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 17/667,941

(22) Filed: Feb. 9, 2022

(65) Prior Publication Data

US 2023/0249508 A1 Aug. 10, 2023

(51) Int. Cl.
*B60G 7/02* (2006.01)
*B60G 7/00* (2006.01)
*B60G 3/06* (2006.01)

(52) U.S. Cl.
CPC ............ *B60G 7/02* (2013.01); *B60G 3/06* (2013.01); *B60G 7/001* (2013.01); *B60G 2200/154* (2013.01); *B60G 2204/1431* (2013.01); *B60G 2204/418* (2013.01); *B60G 2206/016* (2013.01); *B60G 2206/122* (2013.01)

(58) Field of Classification Search
CPC ............ B60G 7/001; B60G 2200/154; B60G 2204/1431; B60G 2206/016; B60G 2206/122
See application file for complete search history.

(56) References Cited

U.S. PATENT DOCUMENTS

| | | | |
|---|---|---|---|
| 5,374,075 A | 12/1994 | Lee | |
| 5,990,787 A | 11/1999 | Kim | |
| 6,460,889 B2 | 10/2002 | Iyanagi et al. | |
| 6,640,468 B2 | 11/2003 | Menze | |
| 6,861,029 B2 | 3/2005 | Menk et al. | |
| 6,994,374 B2* | 2/2006 | Miyasaka | B60G 7/02 280/784 |
| 7,360,621 B2 | 4/2008 | Komiya | |

(Continued)

FOREIGN PATENT DOCUMENTS

| | | |
|---|---|---|
| CN | 203888608 | 10/2014 |
| CN | 105034999 | 11/2015 |

(Continued)

*Primary Examiner* — Paul N Dickson
*Assistant Examiner* — Tiffany L Webb
(74) *Attorney, Agent, or Firm* — Mark E. Duell; RANKIN, HILL & CLARK LLP (57) ABSTRACT

A vehicle includes a control arm having a first branch portion extended from a second branch portion, the first branch portion and the second branch portion being fixed with a frame of the vehicle, and a third branch portion extended from the second branch portion, and coupled with a wheel. The vehicle also includes a first joint fixing the first branch portion to the frame, and a second joint located behind the first joint along the frame in a vehicle longitudinal direction, and fixing the second branch portion to the frame with a first bracket extending along the frame, outward from the second branch portion in a vehicle lateral direction. The first bracket is fixed to the frame at a first bracket weakened portion, and configured such that the second branch portion separates the first bracket weakened portion from the frame while the first joint remains fixed to the frame.

20 Claims, 5 Drawing Sheets

(56) References Cited

U.S. PATENT DOCUMENTS

| | | | | |
|---|---|---|---|---|
| 8,033,557 | B2 * | 10/2011 | Dundon | B60G 7/001 |
| | | | | 280/124.135 |
| 8,459,674 | B2 * | 6/2013 | Mielke | B60G 7/001 |
| | | | | 280/124.134 |
| 8,894,129 | B2 | 11/2014 | Katou et al. | |
| 9,150,253 | B2 | 10/2015 | Watanabe et al. | |
| 9,789,743 | B2 * | 10/2017 | Donkai | B60G 7/005 |
| 11,192,589 | B2 * | 12/2021 | Okamoto | B60G 7/001 |
| 11,247,726 | B2 * | 2/2022 | Eklund | B60G 7/02 |
| 11,628,700 | B2 * | 4/2023 | Twu | B60K 5/12 |
| | | | | 280/124.109 |
| 2015/0336546 | A1 | 11/2015 | Al-Zahrani | |
| 2020/0369107 | A1 | 11/2020 | Senoo et al. | |

FOREIGN PATENT DOCUMENTS

| | | |
|---|---|---|
| CN | 204894986 | 12/2015 |
| CN | 205149429 | 4/2016 |
| CN | 106198051 | 12/2016 |
| CN | 112622543 | 4/2021 |
| CN | 213121049 | 5/2021 |
| JP | 2004114813 | 4/2004 |
| JP | 3613226 | 1/2005 |
| JP | 2013035360 | 2/2013 |
| JP | 5736943 | 6/2015 |
| KR | 100482082 | 4/2005 |
| KR | 100953322 | 4/2010 |

* cited by examiner

VEHICLE CONTROL ARM ASSEMBLY

BACKGROUND

Vehicle components that deform against an object in a collision to absorb substantial kinetic energy between a vehicle and the object improve occupant safety over components that otherwise break, fracture, or are ejected from the vehicle. In this regard, a continued design challenge in vehicle assemblies with improved occupant safety involves guiding a wheel and vehicle components disposed therein against a frame of the vehicle in a forward collision at the wheel.

BRIEF DESCRIPTION

According to one aspect, a vehicle includes a control arm having a first branch portion extended from a second branch portion, the first branch portion and the second branch portion being fixed with a frame of the vehicle, and a third branch portion extended from the second branch portion, and coupled with a wheel of the vehicle. The vehicle also includes a first joint fixing the first branch portion to the frame, and a second joint located behind the first joint along the frame in a vehicle longitudinal direction, and fixing the second branch portion to the frame with a first bracket extending along the frame, outward from the second branch portion in a vehicle lateral direction. The first bracket is fixed to the frame at a first bracket weakened portion, and configured such that in a crash event where the control arm is forced backward in the vehicle longitudinal direction relative to the frame at a position of the control arm outward from the first joint in the vehicle lateral direction, the second branch portion separates the first bracket weakened portion from the frame while the first joint remains fixed to the frame.

According to another aspect, a control arm for a vehicle, the control arm including a first branch portion configured for being fixed to a frame of a vehicle, a second branch portion extended from the first branch portion and configured for being fixed to the frame behind the first branch portion in a longitudinal direction of the vehicle, and a third branch portion extended from the second branch portion, and configured for being coupled with a wheel of the vehicle. The control arm also includes a joint disposed on the second branch portion and configured to fix the second branch portion to the frame with a first bracket that defines a first hole configured for receiving a first fastener to fix the joint to the frame, and defines a slot from the first hole to an edge of the first bracket.

According to another aspect, a control arm including a first branch portion configured for being fixed to a frame of a vehicle, a second branch portion extended from the first branch portion and configured for being fixed to the frame, a third branch portion extended from the second branch portion, and configured for being coupled with a wheel of the vehicle, and a joint disposed on the second branch portion, and configured for fixing the second branch portion to the frame with a first bracket and a second bracket. The first branch portion has a weakened portion configured such that when the control arm is forced backward in the vehicle longitudinal direction relative to the frame, from a position outward from the first joint in the vehicle lateral direction, the control arm deforms at the first branch portion and drives the joint along the frame through the second branch portion. The first bracket has a first bracket weakened portion configured such that when the joint is driven along the frame through the second branch portion, the first bracket separates from the frame while the second bracket remains fixed to the frame.

DETAILED DESCRIPTION

Figure 1:
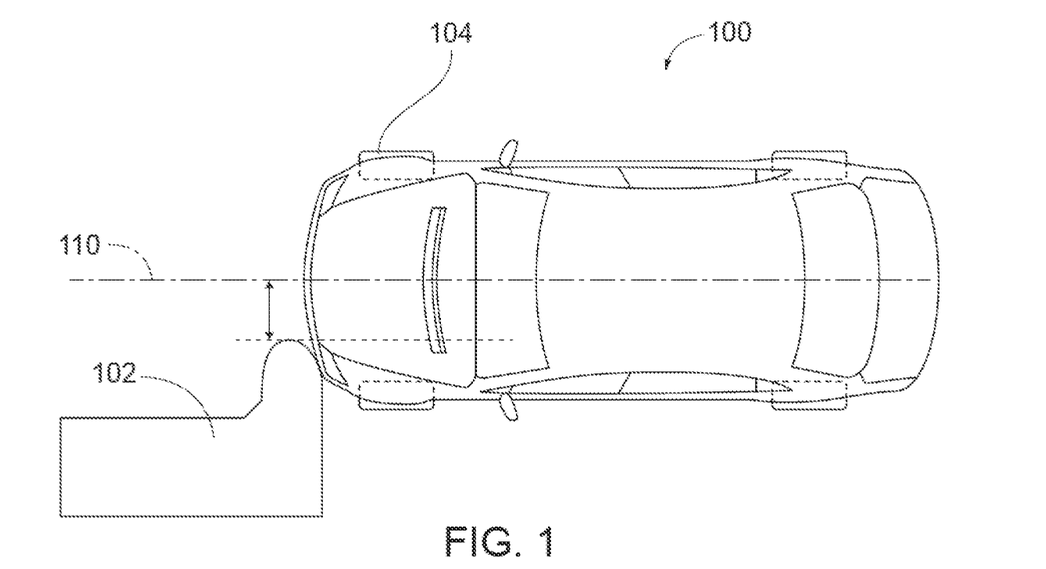
FIG. 1 is a top view of a vehicle in a forward collision with a barrier.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a vehicle 100 in a crash event, specifically a forward collision with a barrier 102. In the forward collision, the barrier 102 loads a lateral side of the vehicle 100 backward in a vehicle longitudinal direction, at a wheel 104 offset from a vehicle centerline 110 in a vehicle lateral direction.

Figure 2:
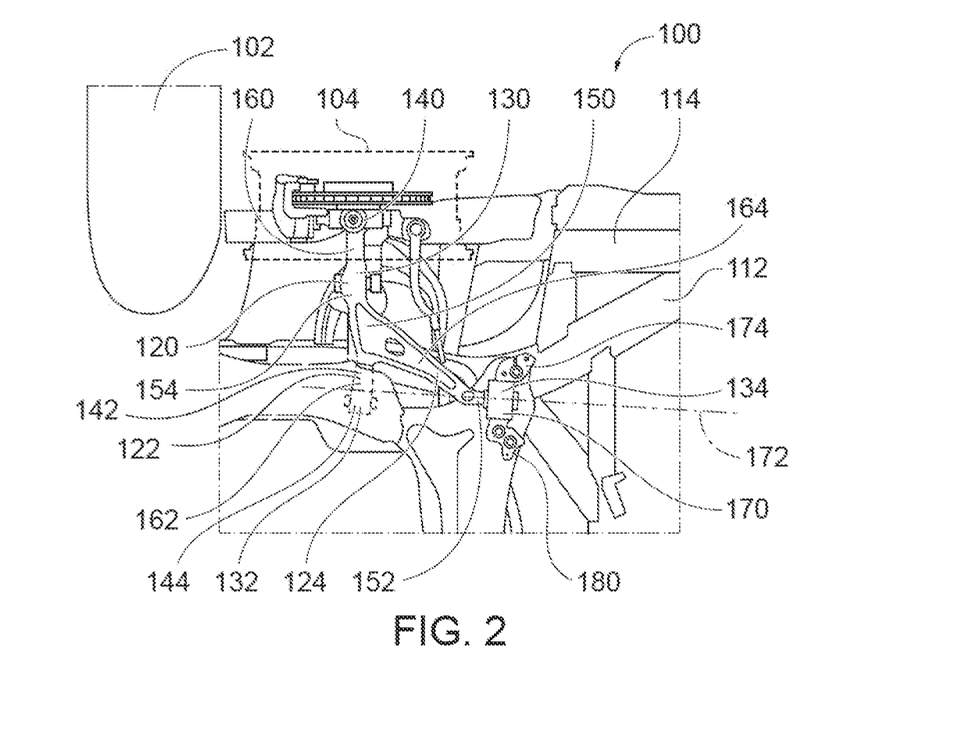
FIG. 2 is a partial bottom view of the vehicle in the forward collision with the barrier.
Figure 3:
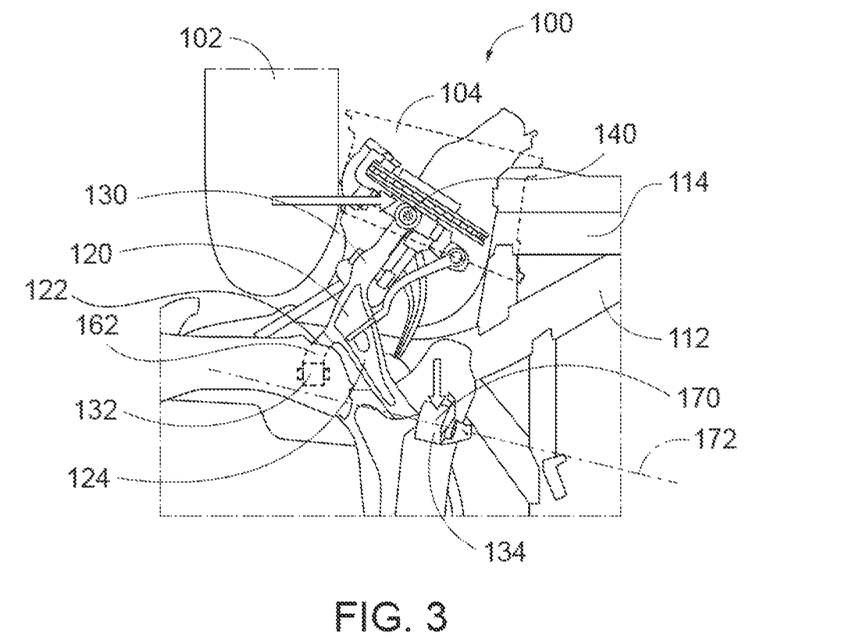
FIG. 3 is another partial bottom view of the vehicle in the forward collision with the barrier, taken at a point in time following the view in FIG. 2.
Figure 4:
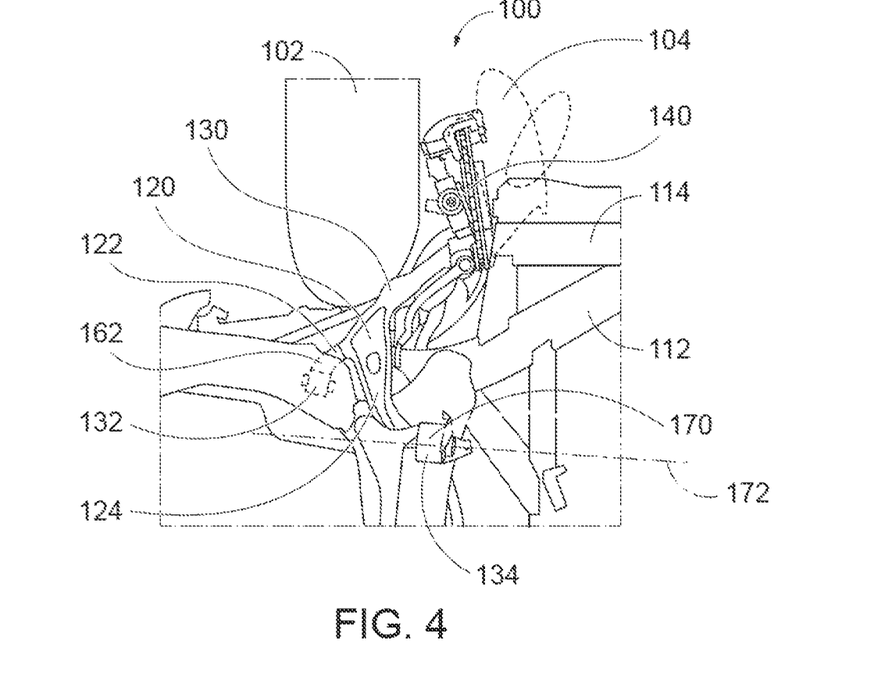
FIG. 4 is another partial bottom view of the vehicle in the forward collision with the barrier, taken at a point in time following the view in FIG. 3.

FIGS. 2-4 depict a bottom view of the vehicle 100 including the wheel 104 in successive stages of the collision with the barrier 102 depicted in FIG. 1. As depicted between FIGS. 2-4, the wheel 104 is deformed and pressed against a frame 112 of the vehicle 100 at a side sill 114. A control arm 120 is fixed with the frame 112 and coupled with the wheel 104 to control movement of the wheel 104 with respect to the frame 112 for steering the vehicle 100. In the depicted collision between the vehicle 100 and the barrier 102, the control arm 120 remains coupled to the wheel 104 and partly fixed to the frame 112, deforming between the wheel 104 and the frame 112 as the wheel 104 is pressed against the side sill 114.

With reference to FIG. 2, the control arm 120 includes a first branch portion 122 fixed with the frame 112, a second branch portion 124 fixed with the frame 112, and a third branch portion 130 coupled with the wheel 104. The first branch portion 122 is fixed to the frame 112 through a first joint 132 drawn in hidden lines. The second branch portion 124 is fixed to the frame 112 through a second joint 134 located behind the first joint 132 along the frame 112 in the vehicle longitudinal direction. The third branch portion 130 is coupled to the wheel 104 through a third joint 140.

The first branch portion 122 includes a first branch proximal end portion 142 fixed with the second branch portion 124, and a first branch distal end portion 144 extended from a first branch proximal end portion 142 and configured for being fixed to the frame 112 through the first joint 132. The second branch portion 124 includes a second branch proximal end portion 150 fixed with the first branch proximal end portion 142, and a second branch distal end portion 152 extended from the second branch proximal end portion 150 and fixed to the frame 112 through the second joint 134. The third branch portion 130 includes a third branch proximal end portion 154 fixed with the second branch proximal end portion 150, and a third branch distal end portion 160 extended from the third branch proximal end portion 154 and fixed to the frame 112 through the third joint 140.

The first branch portion 122 and the third branch portion 130 extend from the second branch distal end portion 152 in opposite directions and are approximately aligned in the vehicle width direction, forming an approximate straight lever in the control arm 120 on the frame 112, from the third joint 140 through the first joint 132 across the second branch portion 124. The second branch portion 124 extends from between the first branch proximal end portion 142 and the third branch proximal end portion 154 at an angle closer to the first branch portion 122 than the third branch portion 130.

As shown in the collision depicted between FIGS. 2-4, a force from the barrier 102 on the wheel 104 to the control arm 120 at a position offset outward from the first joint 132 in the vehicle lateral direction is transferred from the first branch portion 122, the second branch proximal end portion 150 and the third branch portion 130 through the second branch portion 124 to the second joint 134. With reference to FIG. 2, the first branch portion 122 has a first branch weakened portion 162 interposed between and separating the first branch distal end portion 144 and the first branch proximal end portion 142 along the first branch portion 122. Taken from a bottom view of the vehicle 100, the first branch weakened portion 162 is a thinned portion of the first branch portion 122 having a minimum width smaller than a minimum width of the first branch distal end portion 144 and the first branch proximal end portion 142. The first branch weakened portion 162 is flexible as compared to the first branch distal end portion 144, the first branch proximal end portion 142, and the second branch portion 124 such that when the control arm 120 is forced backward in the vehicle longitudinal direction relative to the frame 112 at a position of the control arm 120 outward from the first joint 132 in the vehicle lateral direction, the control arm 120 is configured to deform at the first branch weakened portion 162 more readily than the second branch portion 124.

The second branch portion 124 is formed from a triangular body 164 that is rigid as compared to the first branch weakened portion 162 and extends from the second branch distal end portion 152 to the second branch proximal end portion 150. The first branch portion 122 and the third branch portion 130 are fixed to corners of the triangular body 164 at the second branch proximal end portion 150, with the first branch portion 122 extending inward from the second branch portion 124 in the vehicle lateral direction, and the third branch portion 130 extending outward from the second branch portion 124 in the vehicle lateral direction.

As shown in between FIGS. 2-4, the force generated in the collision between the vehicle 100 and the barrier 102 causes the control arm 120 to deform around the first joint 132 at the first branch weakened portion 162. In the depicted collision, the control arm 120 deforms at a position outward from the first joint 132 in the vehicle lateral direction, and backward in the vehicle longitudinal direction relative to the frame 112.

The force generated in the collision between the vehicle 100 and the barrier 102 is directed through the second branch portion 124 and to the second joint 134 as the control arm 120 deforms around the first joint 132. As shown in FIG. 3, the force directed through the second branch portion 124 to the second joint 134 drives the second joint 134 inward in the vehicle lateral direction, causing the second joint 134 to partly separate from the frame 112 while the first joint 132 remains fixed to the frame 112. As shown in FIG. 4, the force directed through the second branch portion 124 to the second joint 134 continues to drive the second joint 134 inward in the vehicle lateral direction as the barrier 102 deforms the wheel 104 and the third branch portion 130 against the side sill 114, while the first joint 132 remains fixed to the frame 112.

As shown in FIG. 2, the second joint 134 includes a bearing 170 with a bearing rotational axis 172, a first bracket 174 that extends from a side of the bearing 170, and a second bracket 180 that extends from a side of the bearing 170 opposite the first bracket 174 across the bearing rotational axis 172. The second branch distal end portion 152 is inserted in the bearing 170 along the bearing rotational axis 172, and the second joint 134 fixes the second branch portion 124 to the frame 112 with the first bracket 174 and the second bracket 180.

The first bracket 174 is fixed on the frame 112 at a location farther outward in the vehicle lateral direction than the second bracket 180. The first bracket 174 extends along the frame 112 radially outward from the bearing 170, in a direction in which the third branch portion 130 extends, outward from the second branch portion 124 in the vehicle lateral direction. The second bracket 180 extends along the frame 112 radially outward from the bearing 170 in a direction opposite the first bracket 174 and from the side of the bearing 170 opposite the first bracket 174. The second bracket 172 extends along a direction in which the first branch portion 122 extends, inward from the second branch portion 124 in the vehicle lateral direction.

As shown in the collision depicted between FIGS. 2-4, the bearing 170 is configured for being driven inward in the vehicle lateral direction by the second branch portion 124 along the frame 112 when the control arm 120 is forced backward in the vehicle longitudinal direction relative to the frame 112 at a position of the control arm 120 outward from the first joint 132 in the vehicle lateral direction. As shown in FIG. 2, the bearing rotational axis 172 intersects the first branch portion 122 at the first branch weakened portion 162 where, as shown in FIG. 3, the control arm 120 deforms around the first joint 132, facilitating the bearing 170 rotating along the frame 112 when the control arm 120 deforms around the first joint 132 as shown in FIG. 4.

Figure 5:
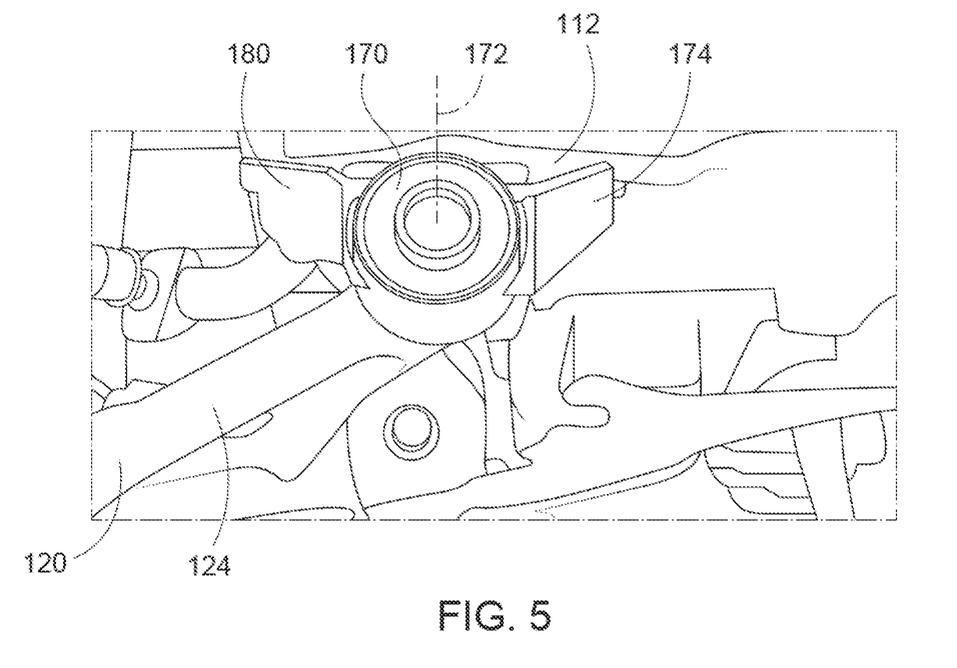
FIG. 5 is a partial back perspective view of the vehicle in the forward collision with the barrier, taken at the point in time shown in FIG. 3.
Figure 6:
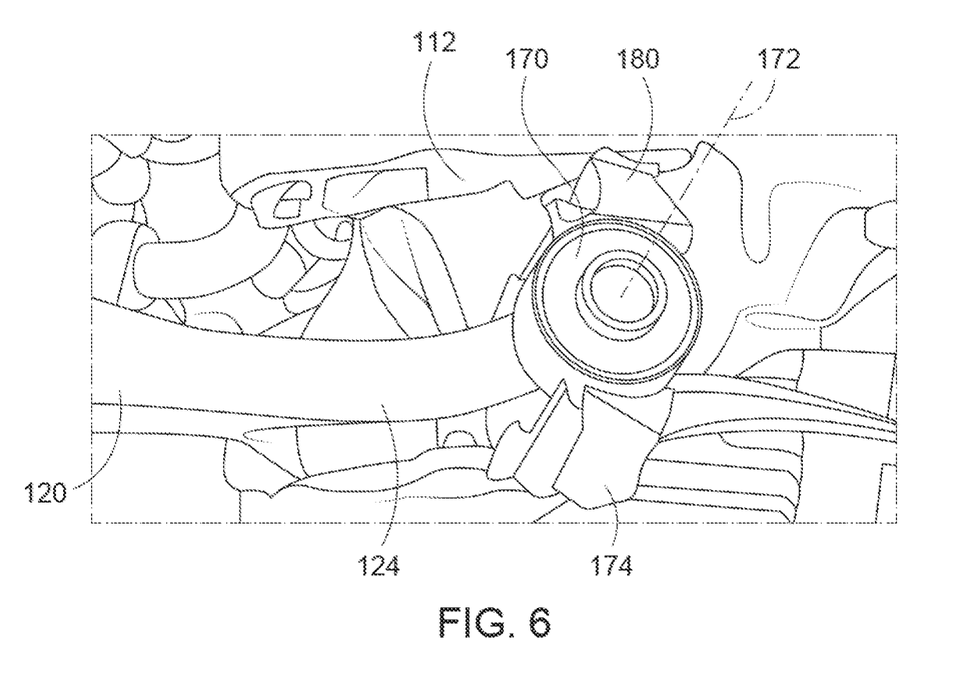
FIG. 6 is a partial back perspective view of the vehicle in the forward collision with the barrier, taken at the point in time shown in FIG. 4.

FIGS. 5 and 6 respectively depict the successive stages of the collision between the vehicle 100 and the barrier 102 depicted in FIGS. 3 and 4. As shown in FIGS. 5 and 6, the bearing 170 has a circular profile from a view taken in the bearing rotational axis 172. The circular profile of the bearing 170 rotates around the second branch portion 124, and rolls over the second bracket 180 along the frame 112. The bearing 170 rolls along the frame 112 such that the side of the bearing 170 from which the first bracket 174 extends rotates away from the frame 112, lifting the first bracket 174 from the frame 112, separating the first bracket 174 from the frame 112. Also, the bearing 170 rolls over the side of the bearing 170 from which the second bracket 180 extends, folding the second bracket 180 inward in the vehicle lateral direction.

Figure 7:
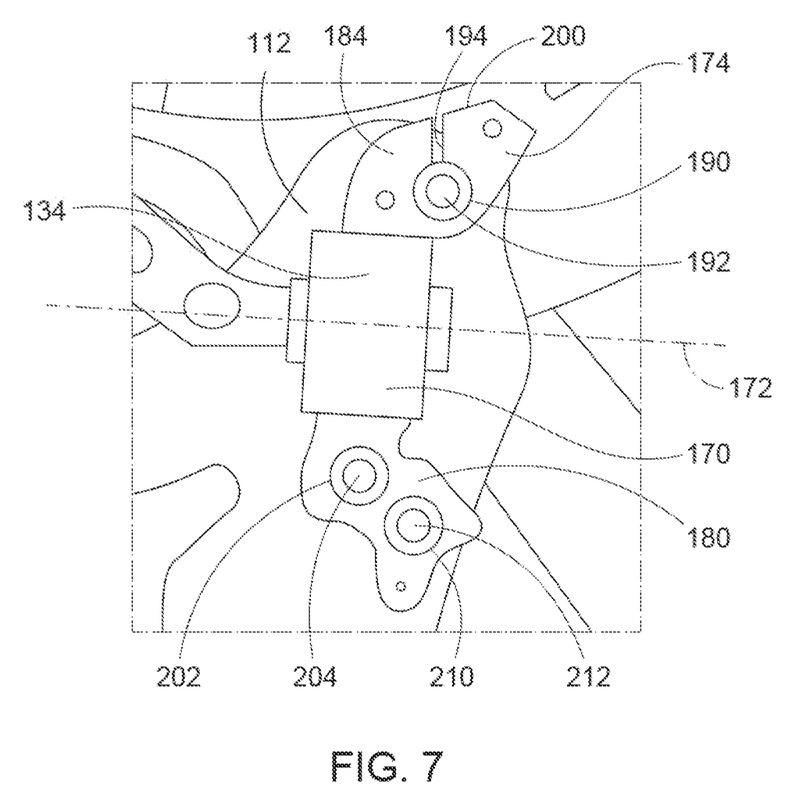
FIG. 7 is an enlarged partial bottom view of the vehicle.

As shown in FIG. 7, the first bracket 174 includes a first bracket weakened portion 184 that is a flange portion of the first bracket 174 defining a first hole 190 configured for receiving a first fastener 192. The first bracket weakened portion 184 also defines a slot 194 extended in the vehicle lateral direction through the first bracket 174 from the first hole 190 to an edge 200 along a perimeter of the first bracket 174. The slot 194 extends along the frame 112 in a direction orthogonal to the bearing rotational axis 172, the bearing rotational axis 172 being a line intersecting the first branch portion 122 and the second joint 134 (see FIG. 2).

Figure 8:
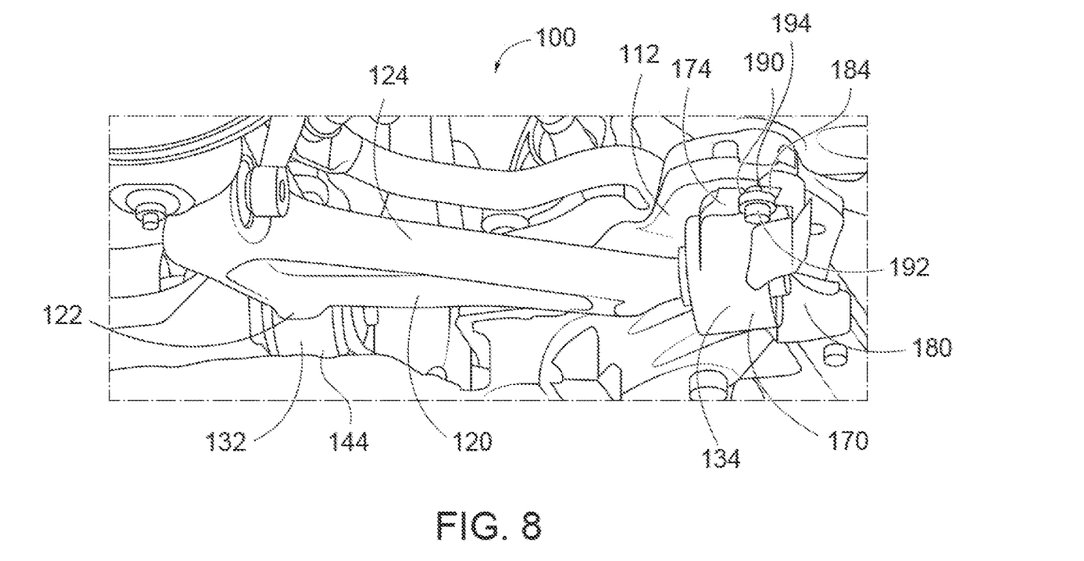
FIG. 8 is a partial side perspective view of the vehicle in the forward collision with the barrier, taken at the point in time shown in FIG. 3.
Figure 9:
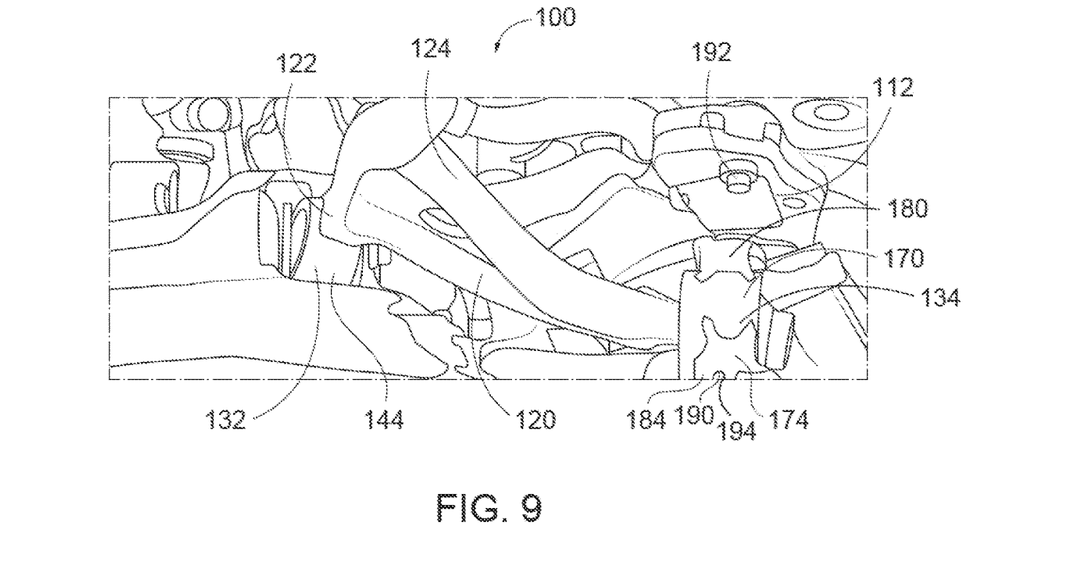
FIG. 9 is a partial side perspective view of the vehicle in the forward collision with the barrier, taken at the point in time shown in FIG. 4.

FIGS. 8 and 9 respectively depict the successive stages of the collision between the vehicle 100 and the barrier 102 depicted in FIGS. 3 and 4. The first bracket weakened portion 184 is fragile as compared to the first joint 132 and the second bracket 180 such that when the control arm 120 deforms around the first joint 132 as shown between FIGS. 8 and 9, the first bracket 174 separates from the frame 112 at the first bracket weakened portion 184 while the first joint 132 and the second bracket 180 remain fixed to the frame 112. More specifically, the first bracket 174 is fragile at the first hole 190 as compared to the second bracket 180 where the second bracket 180 is fixed to the frame 112 such that the first bracket weakened portion 184 bends and breaks from the frame 112 before the second bracket 180 in response to a force acting on the second joint 134 relative to the frame 112 from the first hole 190 toward the second bracket 180. In this manner, when the control arm 120 is forced backward in the vehicle longitudinal direction relative to the frame 112 at a position of the control arm 120 outward from the first joint 132 in the vehicle lateral direction, the first bracket 174 separates from the frame 112 while the second bracket 180 remains fixed to the frame 112. When the bearing 170 is driven to rotate around the second branch portion 124 and roll over the second bracket 180, the bearing 170 pulls the first bracket 174 from the first fastener 192 through the slot 194 while the first fastener 192 remains fixed with the frame 112.

With reference to FIG. 7, the second bracket 180 defines a second hole 202 configured for receiving a second fastener 204, and defines a third hole 210 configured for receiving a third fastener 212, where the second fastener 204 and the third fastener 212 fix the second bracket 180 to the frame 112. While the depicted second bracket 180 defines the second hole 202 and the third hole 210 for receiving the second fastener 204 and the third fastener 212, the second bracket 180 may alternatively define more or fewer holes configured for receiving corresponding fasteners for fixing the second bracket 180 to the frame 112 more securely that the first bracket 174 without departing from the scope of the present disclosure. Further, the second bracket 180 may be fixed to the frame 112 with fastener types or fastening methods alternative to the second fastener 204 and the third fastener 212 without departing from the scope of the present disclosure.

As shown in FIG. 8, the first joint 132 is a bushing joint where the first branch distal end portion 144 forms a bushing fixed with the frame 112, however the first joint 132 may alternatively embody another form of bushing joint or another joint type without departing from the scope of the present disclosure. With reference to FIG. 2, in the depicted embodiment, the third joint 140 is a ball joint connecting the third branch distal end portion 160 with the wheel 104, however the third joint 140 may alternatively embody another form of ball joint than the depicted third joint 140, or another joint type connecting the third branch distal end portion 160 with the wheel 104 without departing from the scope of the present disclosure.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:
   a control arm having a first branch portion extended from a second branch portion, the first branch portion and the second branch portion being fixed with a frame of the vehicle, and a third branch portion extended from the second branch portion, and coupled with a wheel of the vehicle;
   a first joint fixing the first branch portion to the frame; and
   a second joint located behind the first joint along the frame in a vehicle longitudinal direction, and fixing the second branch portion to the frame with a first bracket extending along the frame, outward from the second branch portion in a vehicle lateral direction,
   wherein the first bracket is fixed to the frame at a first bracket weakened portion extending in the vehicle lateral direction, and the first bracket is configured such that in a crash event where the control arm is forced backward in the vehicle longitudinal direction relative to the frame at a position of the control arm outward from the first joint in the vehicle lateral direction, the second branch portion separates the first bracket from the frame along the first bracket weakened portion moving the second joint inward in the vehicle lateral direction while the first joint remains fixed to the frame.

2. The vehicle of claim 1, wherein the first bracket weakened portion defines a first hole configured for receiving a first fastener, and defines a slot extended in the vehicle lateral direction through the first bracket from the first hole to an edge of the first bracket.

3. The vehicle of claim 1, wherein the second joint includes a bearing, the second branch portion is inserted in the bearing, and wherein during the crash event the bearing rotates around the second branch portion and rolls along the frame, separating the first bracket from the frame.

4. The vehicle of claim 1, wherein the second joint includes a second bracket fixed to the frame and extended from the second branch portion inward in the vehicle lateral direction, and
   wherein during the crash event the first bracket weakened portion is configured such that the first bracket separates from the frame while the second bracket remains fixed to the frame.

5. The vehicle of claim 4, wherein the first bracket weakened portion defines a first hole configured for receiving a first fastener fixing the first bracket to the frame, and defines a slot through the first bracket from the first hole to an edge of the first bracket.

6. The vehicle of claim 4, wherein the first bracket is fixed on the frame at a location farther outward in the vehicle lateral direction than the second bracket.

7. The vehicle of claim 4, wherein the second joint includes a bearing into which the second branch portion is inserted, the first bracket extends from the bearing along the frame outward in the vehicle lateral direction, and the second bracket extends from the bearing along the frame inward in the vehicle lateral direction, and wherein during the crash event the bearing is configured to rotate around the second branch portion and roll over the second bracket along the frame.

8. The vehicle of claim 7, wherein the first branch portion includes a first branch proximal end portion fixed with the second branch portion, a first branch distal end portion fixed with the first joint, and a first branch weakened portion interposed between and separating the first branch distal end portion and the first branch proximal end portion along the first branch portion, and wherein the bearing has a bearing rotational axis that intersects the first branch weakened portion.

9. The vehicle of claim 1, wherein the second joint includes a bearing with a bearing rotational axis, and the second branch portion is inserted in the bearing along the bearing rotational axis, wherein the first bracket weakened portion defines a first hole configured for receiving a first fastener in a direction orthogonal to the bearing rotational axis, and defines a slot through the first bracket from the first hole to an edge along a perimeter of the first bracket, and wherein the slot extends along the frame in a direction orthogonal to the bearing rotational axis.

10. The vehicle of claim 1, wherein the first branch portion includes a first branch proximal end portion fixed with the second branch portion, a first branch distal end portion fixed with the first joint, and a first branch weakened portion interposed between and separating the first branch distal end portion and the first branch proximal end portion along the first branch portion, and wherein during the crash event the first branch weakened portion is configured such that the first branch weakened portion deforms around the first joint while the second branch portion separates the second joint from the frame and the first joint remains fixed to the frame.

11. The vehicle of claim 1, wherein the frame includes a side sill positioned behind the wheel in the vehicle longitudinal direction, and wherein during the crash event the first branch portion is configured to deform around the first joint such that the wheel deforms against the side sill with the third branch portion while the control arm remains fixed to the frame at the first joint.

12. The control arm of claim 1, wherein the first branch portion and the third branch portion are aligned in the vehicle width direction and extend in opposite directions from each other, forming a straight lever on the frame through the first joint.

13. A control arm for a vehicle, the control arm comprising:

a first branch portion configured for being fixed to a frame of a vehicle;

a second branch portion extended from the first branch portion and configured for being fixed to the frame behind the first branch portion in a longitudinal direction of the vehicle;

a third branch portion extended from the second branch portion, and configured for being coupled with a wheel of the vehicle; and a joint disposed on the second branch portion and configured to fix the second branch portion to the frame with a first bracket that defines a first hole configured for receiving a first fastener to fix the joint to the frame, and defines a slot from the first hole to an edge of the first bracket, wherein the joint includes a bearing, the second branch portion is inserted in the bearing, and wherein during a crash event the bearing rotates around the second branch portion and rolls along the frame, separating the first bracket from the frame.

14. The control arm of claim 13, wherein the slot extends from the hole to the edge of the first bracket in a direction orthogonal to a line intersecting the first branch portion and the joint.

15. The control arm of claim 14, wherein the joint includes the bearing with a bearing rotational axis that intersects the first branch portion, the second branch portion is inserted in the bearing along the bearing rotational axis, and the slot extends in a direction orthogonal to the bearing rotational axis.

16. The control arm of claim 13, wherein the joint includes a second bracket configured to fix the joint to the frame, and wherein the first bracket at the first hole is configured such that when the first bracket and the second bracket fix the joint to the frame, a force acting on the joint relative to the frame from the first bracket toward the second bracket causes the first bracket to separate from the frame while the second bracket remains fixed to the frame.

17. The control arm of claim 13, wherein the joint includes a second bracket, the first bracket extends along a direction in which the third branch portion extends, and the second bracket extends along a direction in which the first branch portion extends such that, when the second branch portion is fixed with the frame, the first bracket extends outward in a vehicle lateral direction and the second bracket extends inward in the vehicle lateral direction.

18. The control arm of claim 13, wherein a bearing rotational axis of the bearing intersects the first branch portion, wherein the first bracket extends radially outward from the bearing, the joint includes a second bracket that extends radially outward from the bearing at a side of the bearing opposite the first bracket across the bearing rotational axis, and is configured to fix the joint to the frame, and wherein the first bracket is configured such that a force acting on the joint relative to the frame from the first bracket toward the second bracket causes the first bracket to separate from the frame, and causes the bearing to roll over the second bracket along the frame while the second bracket remains fixed to the frame.

19. The control arm of claim 18, wherein the first hole is configured to receive the first fastener in a direction orthogonal to the bearing rotational axis for fixing the joint to the frame, and wherein the first bracket is configured such that a force acting on the joint relative to the frame from the first hole toward the second bracket causes the first bracket to separate from the frame while the second bracket remains fixed to the frame.

20. A control arm comprising:

a first branch portion configured for being fixed to a frame of a vehicle;

a second branch portion extended from the first branch portion and configured for being fixed to the frame;

a third branch portion extended from the second branch portion, and configured for being coupled with a wheel of the vehicle; and a joint disposed on the second branch portion, and configured for fixing the second branch portion to the frame with a first bracket and a second bracket, the first bracket extending outward from the second branch portion in a vehicle lateral direction, and the second bracket extending inward from the second branch portion in the vehicle lateral direction, wherein the first branch portion has a weakened portion configured such that when the control arm is forced backward in a vehicle longitudinal direction relative to the frame, from a position outward from the first joint in the vehicle lateral direction, the control arm deforms at the first branch portion and drives the joint along the frame through the second branch portion, and wherein the first bracket has a first bracket weakened portion extending in the vehicle lateral direction, and configured such that when the joint is driven along the frame through the second branch portion, the first bracket separates from the frame along the first bracket weakened portion while the second bracket remains fixed to the frame, allowing the joint to then move inward in the vehicle lateral direction.

* * * * *